US012655938B2

(12) United States Patent
Abed Abed

(10) Patent No.: US 12,655,938 B2
(45) Date of Patent: Jun. 16, 2026

(54) NON-CYLINDRICAL HYDROGEN STORAGE TANK

(71) Applicant: SAUDI ARABIAN OIL COMPANY, Dhahran (SA)

(72) Inventor: Ghayth Mohammed Hassein Abed Abed, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 140 days.

(21) Appl. No.: 18/664,886

(22) Filed: May 15, 2024

(65) Prior Publication Data

US 2025/0354655 A1 Nov. 20, 2025

(51) Int. Cl.
*F17C 1/08* (2006.01)
*F17C 1/06* (2006.01)

(52) U.S. Cl.
CPC .................. *F17C 1/08* (2013.01); *F17C 1/06* (2013.01); *F17C 2201/0128* (2013.01); *F17C 2201/0157* (2013.01); *F17C 2203/012* (2013.01); *F17C 2203/0624* (2013.01); *F17C 2203/066* (2013.01); *F17C 2203/0673* (2013.01); *F17C 2209/2127* (2013.01); *F17C 2209/2145* (2013.01); *F17C 2209/2154* (2013.01); *F17C 2209/232* (2013.01); *F17C 2221/012* (2013.01)

(58) Field of Classification Search
CPC ........ F17C 1/08; F17C 1/06; F17C 2203/012; F17C 2203/0624; F17C 2201/0128; F17C 2201/0157; F17C 2203/066; F17C 2203/0673; F17C 2209/2127; F17C 2209/2145; F17C 2209/2154; F17C 2209/232; F17C 2221/012; B65D 81/03; Y02E 60/32
See application file for complete search history.

(56) References Cited

U.S. PATENT DOCUMENTS 6,595,382 B2 * 7/2003 Ettlinger .................. F17C 1/08 220/560.11
8,960,485 B2 * 2/2015 Kataoka .................. F16J 12/00 220/608
9,726,326 B2 8/2017 Simmons et al.
(Continued)

FOREIGN PATENT DOCUMENTS

CN 204534113 U 8/2015
CN 109084174 A 12/2018
(Continued)

OTHER PUBLICATIONS

Ruf et al., "Analysis of the Integration of Aramid Fiber Tension Struts in a Box-shaped Pressure Vessel," Applied Composite Materials (2022) 29:1733-1745.
(Continued)

*Primary Examiner* — Don M Anderson
(74) *Attorney, Agent, or Firm* — Vorys, Sater, Seymour and Pease, LLP

(57) ABSTRACT

A storage tank for compressed substances includes a shell, a first layer of reinforcement material applied around the outside facing surface of the shell, an intermediate material provided on an outside facing surface of the first layer of reinforcement material, and a second layer of reinforcement material provided around at least an outside facing surface of the intermediate material.

20 Claims, 5 Drawing Sheets

(56) References Cited

U.S. PATENT DOCUMENTS

| | | | | |
|---|---|---|---|---|
| 10,868,320 | B2 | 12/2020 | Gould et al. | |
| 2015/0336680 | A1 | 11/2015 | Schumacher et al. | |
| 2016/0040829 | A1 * | 2/2016 | Ramoo | B65D 90/08 220/4.12 |
| 2018/0080607 | A1 * | 3/2018 | Van Haaren | F24D 3/1016 |
| 2019/0360638 | A1 * | 11/2019 | Kataoka | F17C 1/16 |
| 2021/0148512 | A1 * | 5/2021 | Saad | F17C 1/00 |
| 2025/0237356 | A1 * | 7/2025 | De Combarieu | F17C 1/08 |
| 2025/0290601 | A1 * | 9/2025 | Mann | F17C 13/084 |

FOREIGN PATENT DOCUMENTS

| | | | |
|---|---|---|---|
| CN | 111347875 | A | 6/2020 |
| EP | 3421864 | B1 | 1/2020 |
| KR | 101953943 | B1 | 3/2019 |
| WO | 2022067765 | A1 | 4/2022 |
| WO | 2023016872 | A1 | 2/2023 |

OTHER PUBLICATIONS

Brooke, “Hydrogen storage in a box!” SAE International, May 31, 2023, https://www.sae.org/news/2023/05/faurecia-h2-storage, 2 pages.

* cited by examiner

NON-CYLINDRICAL HYDROGEN STORAGE TANK

FIELD OF THE DISCLOSURE

The present disclosure relates generally to hydrogen storage tanks and, more particularly, to non-cylindrical hydrogen storage tanks and methods of making the same.

BACKGROUND OF THE DISCLOSURE

Hydrogen is increasingly being utilized as a fuel source for vehicles, such as for powering automobiles. Tanks have been developed for storing liquid and gaseous hydrogen utilized as a fuel source. Existing tanks for storing hydrogen are generally cylindrical in shape, exhibit a circular shape in cross-section, and are installed in a compartment within the vehicle. These geometries, however, are inherently inefficient as they do not allow for maximum utilization of the space within the compartment. For example, where the compartment has a rectangular cross-section and three tanks are provided therein, sizable gaps or voids will be defined between the tanks, such that the entirety of the compartment will not be utilized for storing hydrogen. These gaps/voids can account for a substantial loss of space in the compartment.

Considering the desire to increase the range of vehicles fueled by hydrogen, methods and systems are desired for maximizing the amount of hydrogen that may be stored within a vehicle storage tank and minimizing gaps/voids between tanks and compartments within which they are stored.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a storage tank includes a shell having an outside facing surface, an inside facing surface opposite the outside facing surface and defining an interior storage volume, a plurality of grooves defined on the outside facing surface, and a plurality of ribs extending into the interior storage volume from the inside facing surface. The storage tank also includes a first layer of reinforcement material applied within the plurality of grooves, and an intermediate material arranged within the plurality of grooves such that the first layer of reinforcement material interposes the shell and the intermediate material. Further, the storage tank includes a second layer of reinforcement material provided about and encapsulating the shell.

In another embodiment, a method of manufacturing a storage tank includes forming a shell having an outside facing surface, an inside facing surface opposite the outside facing surface and defining an interior storage volume, a plurality of grooves defined on the outside facing surface, and a plurality of ribs extending into the interior storage volume from the inside facing surface. The method also includes wrapping a first layer of reinforcement material around the outside facing surface of the shell and within the plurality of grooves, and applying an intermediate material within the plurality of grooves such that the first layer of reinforcement material interposes the shell and the intermediate material. In addition, the method includes applying a second layer of reinforcement material about the shell and thereby encapsulating the shell.

In a further embodiment, a storage tank includes a shell having an exterior surface, an interior surface opposite the exterior surface and defining an interior storage volume, a plurality of grooves defined in the exterior surface and thereby forming a plurality of ribs protruding into the interior storage volume. The storage tank also includes a first layer of a composite material wrapped about the shell and arranged within the plurality of grooves. Furthermore, the storage tank includes foam provided within the plurality of grooves such that the first layer of composite material interposes the shell and the foam, and a second layer of a composite material wrapped about and encapsulating the shell.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
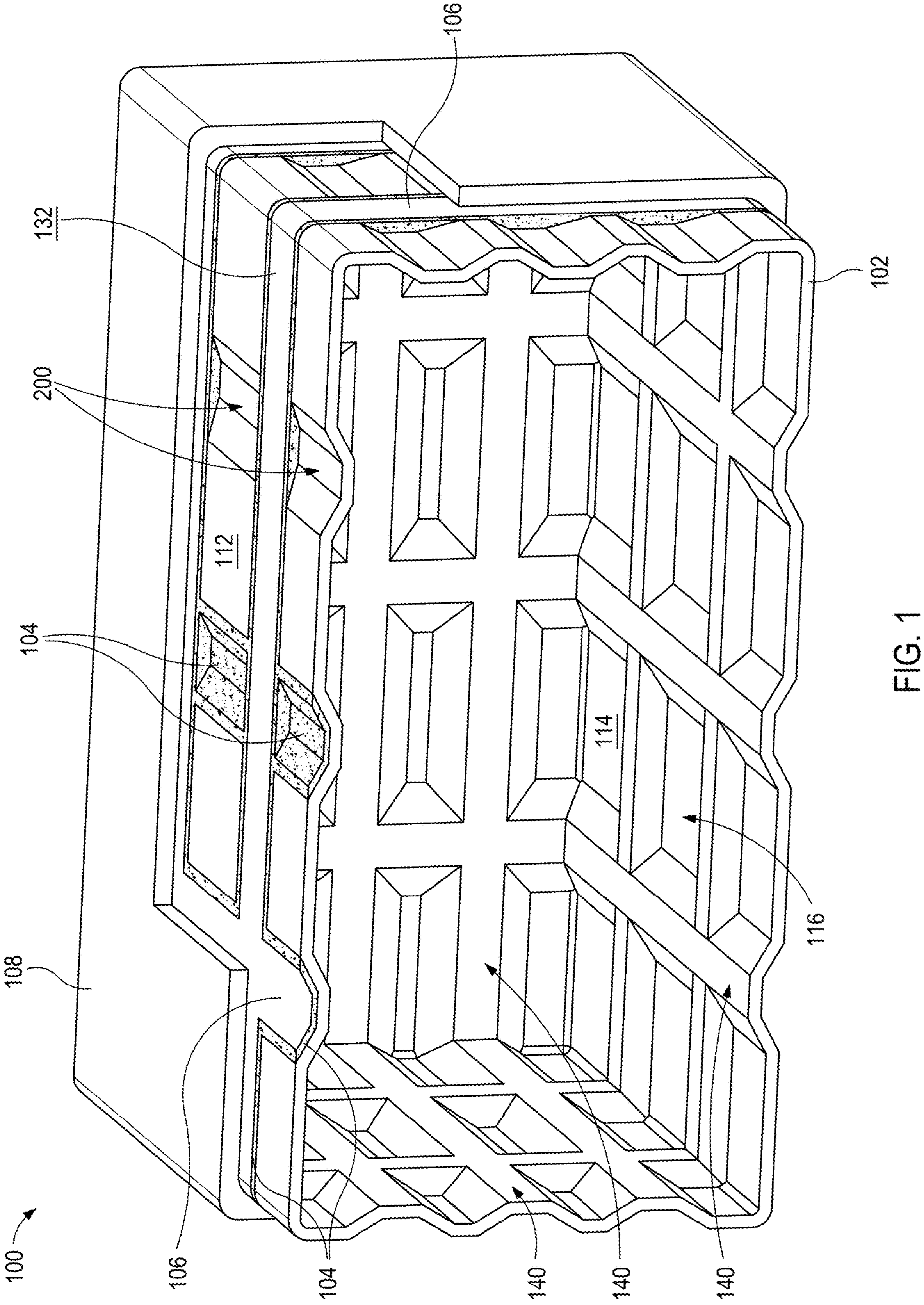
FIG. 1 is a schematic cross-sectional perspective view of an example storage tank, according to one or more embodiments of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to storage tanks used for storing pressurized fluids, such as hydrogen gas. The storage tanks described herein include a shell defining an interior volume within which the pressurized fluid can be stored. In embodiments, the shell exhibits a rectangular cross section. The shell includes a plurality of grooves defined on its outer surface, which results in a corresponding plurality of ribs protruding into the interior volume of the shell. The grooves and ribs may prove advantageous in helping to strengthen the shell.

The storage tanks described herein also include a first layer of reinforcement material wrapped around the outside facing surface (e.g., the exterior) of the shell within the grooves, an intermediate material provided on an outside facing surface of the first layer of reinforcement material, and a second layer of reinforcement material that encloses (encapsulates) the storage tank. In embodiments, the first and second layers of reinforcement material comprise layers of carbon fiber or another composite material. In embodiments, the intermediate material is a foam or honeycomb material. The ribs of the shell enhance the structural integrity of the shell, and the first and second layer of reinforcement material are applied under tension to help the shell resist outward deflection when a compressed substance is stored therein. Moreover, providing the intermediate material within the grooves helps strengthen the ribs, such that the storage tank is able to be manufactured in geometries that would otherwise be subject to undesirable deflection and bowing when housing pressurized substances.

FIG. 1 is a schematic cross-sectional perspective view of an example storage tank 100 utilizable for storing hydrogen gas, according to one or more embodiments of the present disclosure. While the storage tank 100 (hereinafter, "the tank 100") is described with reference to the storage of gaseous hydrogen, the tank 100 may be used to store other substances in various states, without departing from the scope of the disclosure. For example, the tank 100 may instead be utilized to store other substances in gaseous and/or liquid states.

As shown, the tank 100 includes a shell 102, a first or "inner" layer of reinforcement material 104, an intermediate material 106, and a second or "outer" layer of reinforcement material 108. As described in more detail below, the first layer of reinforcement material 104, the intermediate material 106, and the second layer of reinforcement material 108 may be progressively added or applied to shell 102 in series to assemble the tank 100 for use.

Figure 2:
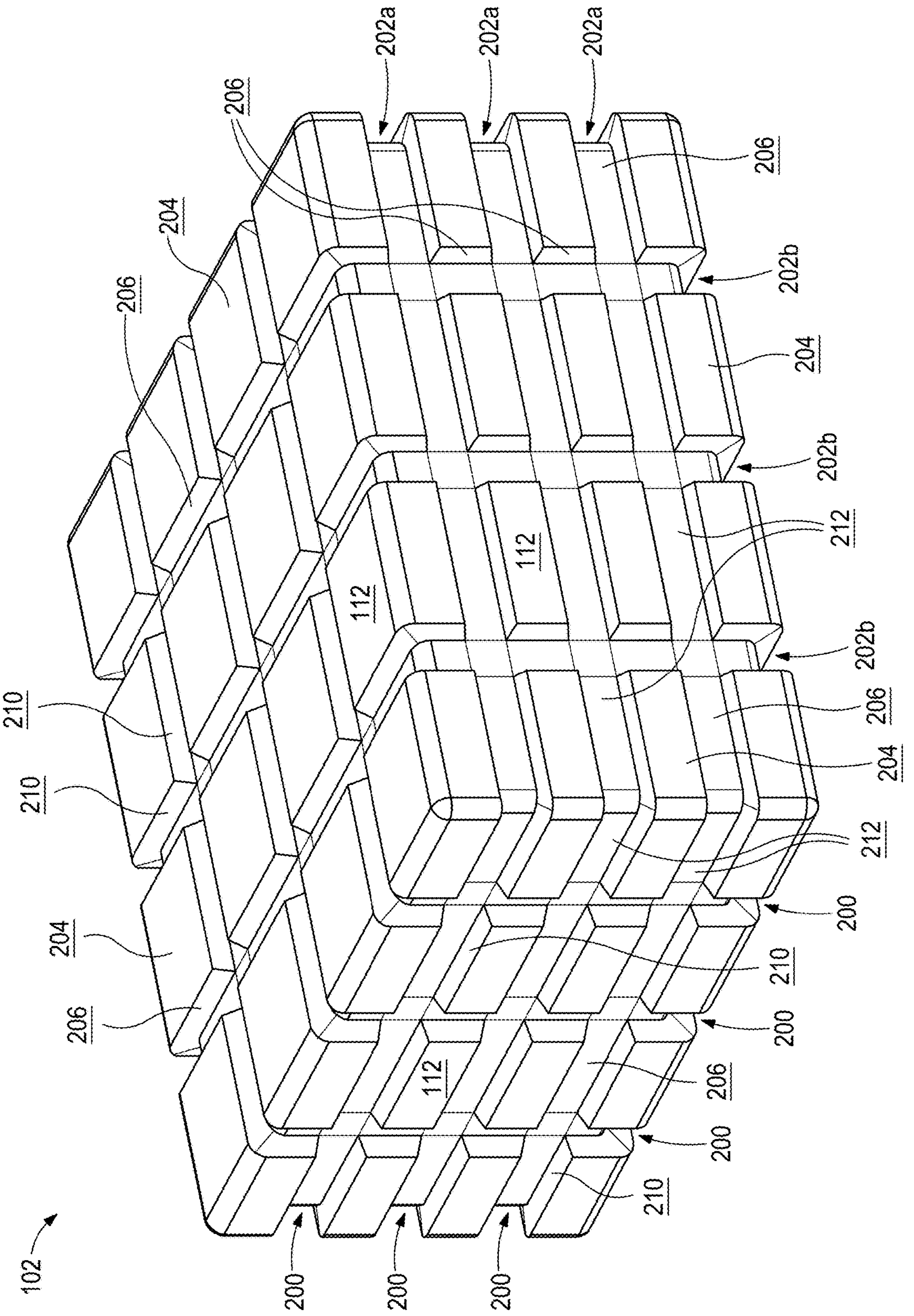
FIG. 2 is a perspective view of a shell of the storage tank of FIG. 1.

The shell 102 may be alternatively referred to as "a liner," and FIG. 2 depicts an example of the shell 102, according to one or more embodiments of the present disclosure. In particular, FIG. 2 depicts the shell 102 without the first layer of reinforcement material 104 (FIG. 1), the intermediate material 106 (FIG. 1), and the second layer of reinforcement material 108 (FIG. 1). Referring to both FIGS. 1 and 2, the shell 102 includes an exterior or "outside facing surface" 112 and an interior or "inside facing surface" 114. The inside facing surface 114 is opposite the outside facing surface 112 and defines an interior storage volume 116 for the shell 102.

In embodiments, the shell 102 exhibits a polygonal or cuboid cross-section. In the illustrated embodiment, the shell 102 exhibits a generally rectangular cross-section. However, the shell 102 may exhibit other polygonal shapes when evaluated in cross-section. The shell 102 may be made from polymer materials, including but not limited to high density polyethylene or polyamide. When using such materials, the shell 102 may be manufactured via rotational molding or blow molding processes. For example, the shell 102 may be manufactured from polyamide 6 (PA6) or polyamide 11 (PA11). However, other materials may be utilized. For example, the shell 102 may be manufactured from a metal material, such as aluminum, steel, or an alloy of aluminum or steel. In such examples, the shell 102 may be manufactured via an additive manufacturing process, 3D printing, or via metal plate welding process.

The inside facing surface 114 of the shell 102 may form or otherwise define a plurality of ribs 140 that protrude inward and towards the interior storage volume 116. The plurality of ribs 140 may help provide reinforcement to pressurized substances that may be contained within the interior storage volume 116 and that may apply outwardly directed forces against the inside facing surface 114 of the shell 102. Thus, the plurality of ribs 140 help to structurally reinforce the shell 102.

As illustrated, the ribs 140 are inwardly protruding or projecting from the inside facing surface 114, and may be formed across the entire inside facing surface 114. Said differently, the ribs may comprise portions of the shell 102 that are recessed outward from the interior storage volume 116 relative to remaining portions of the inside facing surface 114, thus creating a plurality of cuboid protuberances formed on the inside facing surface 114.

In some embodiments, forming the shell 102 with the ribs 140 protruding inward from the inside facing surface 114 results in the formation (generation) of a plurality of grooves 200 defined (provided) on the outside facing surface 112 of the shell 102. In such embodiments, each groove 200 may be associated with a corresponding one of the ribs 140. Thus, as shown, the shell 102 may form or otherwise define the plurality of grooves 200, with each of the grooves 200 corresponding with and being associated with one of the plurality of ribs 140. In the illustrated embodiment, each of the ribs 140 and the grooves 200 associated therewith extends continuously around the shell 102. However, any one or more of the grooves 200 and associated ribs 140 may be discontinuous (i.e., may not extend continuously around the shell 102). Regardless, the ribs 140 and the grooves 200 corresponding therewith may be provided about the shell 102 at positions where stresses are demonstrated or expected to be high when storing a pressurized substance, as may be determined based on modeling or testing.

As best shown in FIG. 2, the plurality of grooves 200 extend (are recessed) into the outside facing surface 112 of the shell 102, and may be the result of forming the shell 102 with the ribs 140. In some embodiments, the grooves 200 may be formed across the entire outside facing surface 112, and may comprise portions of the shell 102 that are recessed toward the interior storage volume 116 relative to remaining portions of the outside facing surface 112, thus creating a plurality of cuboid protuberances formed on the outside facing surface 112.

In at least one embodiment, the grooves 200 may be formed to intersect at generally right angles. For example, in some embodiments, the plurality of grooves 200 may include a first set of grooves **202*a* and a second set of grooves 202*b* that intersects the first set of grooves 202*a*. In the illustrated embodiment, the first set of grooves 202*a* extend perpendicular to the second set of grooves 202*b*, such that each first groove 202*a* intersects an adjacent second groove 202*b* at a right angle. In other embodiments, however, one or more of the first grooves 202*a* may intersect any one or more of the second grooves 202*b*** at an angle offset from 90°, and vice versa.

Also, some portions of the outside facing surface 112 of the shell 102 are located within the grooves 200 and some portions of the outside facing surface 112 are located outside of the grooves 200. For example, as best shown in FIG. 2, the outside facing surface 112 of the shell 102 may provide or define a plurality of exterior cuboid structures or surfaces 204 (also referred to as "exterior surfaces 204"), and the grooves 200 may circumscribe the exterior surfaces 204 and include recessed (angled) side surfaces 206 that are offset and/or angled inward toward the interior storage volume 116. In such embodiments, the first layer of reinforcement material 104 may also be applied on the recessed side surfaces 206 within the grooves 200.

In embodiments, the first layer of reinforcement material 104 is arranged within the grooves 200, such that the first layer of reinforcement material 104 is provided on those portions of the outside facing surface 112 of the shell 102 located within the grooves 200. For example, the first layer of reinforcement material 104 may be applied on at least some of the recessed surfaces 206 of the grooves 200 and, in such embodiments, the intermediate material 106 is arranged on and covering the first layer of reinforcement material 104 within the grooves 200. In such embodiments, the intermediate material 106 may be contained within the grooves 200.

The recessed surfaces 206 define the entirety of the surface within the grooves 200. However, the surfaces 206 provided within each groove 200 may further include a pair of sidewall surfaces 210 extending from the exterior surfaces 204 inward toward the interior storage volume 116, and a base wall surface 212 extending between the pair of sidewall surfaces 210. In embodiments, the first layer of reinforcement material 104 is applied on the base wall surface 212 of each of the grooves 200, but not on the sidewall surfaces 210. In such embodiments, the intermediate material 106 is arranged therein between (and bordering) the pair of sidewalls surfaces 210, the first layer of reinforcement material 104, and the second layer of reinforcement material 108. In other embodiments, however, the first layer of reinforcement material 104 may be applied on the base wall surface 212 and also on the sidewall surfaces 210. In such embodiments, the intermediate material 106 will be arranged between the first layer of reinforcement material 104 provided over the entirety of the surface 206 of the grooves 200 such that the intermediate material 106 does not contact the shell 102.

Figure 3:
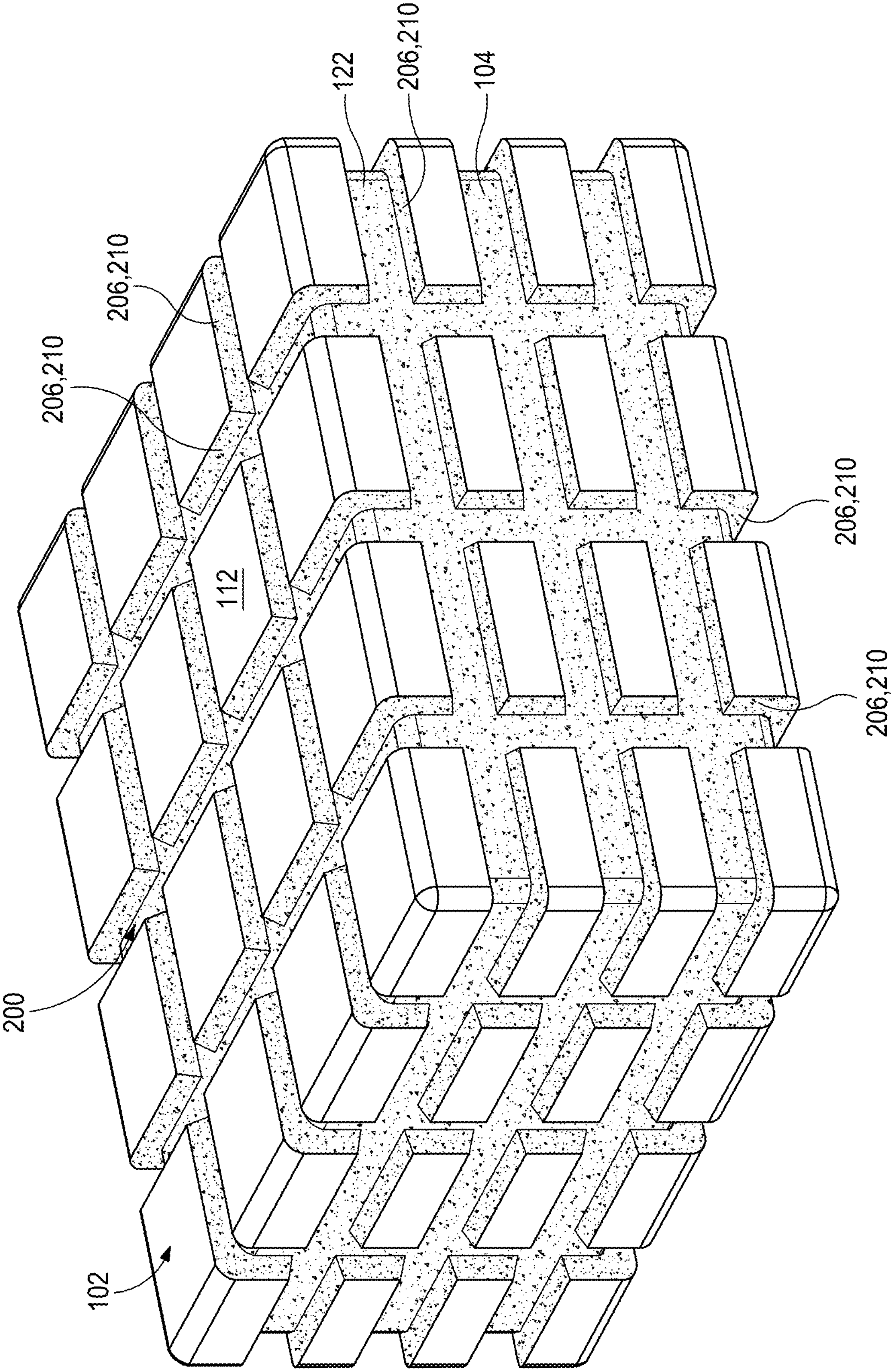
FIG. 3 is a perspective view of the shell of FIGS. 1-2 having a first layer of reinforcement material applied thereon, according to one or more embodiments of the present disclosure.

The first layer of reinforcement material 104 and the intermediate material 106 may be sized to be received within the plurality of grooves 200. FIG. 3 depicts the shell 102 of FIG. 2 with the first layer of reinforcement material 104 applied thereon, according to one or more embodiments of the present disclosure. In FIG. 3, the intermediate material 106 (FIG. 1) and the second layer of reinforcement material 108 (FIG. 1) are omitted to enable viewing of the placement of the first layer of reinforcement material 104. As shown in at least FIGS. 1 and 3, the first layer of reinforcement material 104 may be applied around the outside facing surface 112 of the shell 102 and, more specifically, within the grooves 200 defined in the outside facing surface 112. The first layer of reinforcement material 104 includes an outside facing surface 122 that is visible once applied to the outside facing surface 112 of the shell 102.

In some embodiments, the first layer of reinforcement material 104 may comprise a composite material, for example, in the form of a skin or tape that may be wrapped around the shell 102 within the grooves 200. The first layer of reinforcement material 104 may be applied (wrapped) to the shell 102 under tension, thus applying compressive stress to the shell 102, which may help the shell 102 maintain its shape when pressurized materials are stored within the interior storage volume 116 (FIG. 1). In embodiments, the first layer of reinforcement material 104 is a thermoset or a thermoplastic material. In embodiments, the first layer of reinforcement material 104 is a carbon fiber reinforced polymer (CFRP) tape and, in some of these embodiments, the CFRP tape has a width of 0.5 to 1 inch. In such embodiments, more than one layer of the first layer of reinforcement material 104 is applied within the grooves 200, for example, the first layer of reinforcement material 104 (e.g., the CFRP tape) may be wrapped around the shell 102 several times to ensure that the first layer of reinforcement material 104 fully covers the grooves 200, thereby resulting in several layers of the first layer of reinforcement material 104 being applied within the grooves 200. In an embodiment, the first layer of reinforcement material 104 is a CFRP tape that is tightly wound around the shell 102 within the grooves 200. The tension at which the first layer of reinforcement material 104 is applied should ensure proper consolidation of the reinforcing fibers (of the first layer of reinforcement material 104) and provide compression force on the shell 102. However, excessive tension may cause fiber breakage (of the first layer of reinforcement material 104) and/or deformation of the shell 102. Thus, the tension at which the first layer of reinforcement material 104 is applied may be selected based on several parameters, such as the width of the first layer of reinforcement material 104, the size of the interior storage volume 116, and the pressures to be experienced within the interior storage volume 116 during end use, so as to achieve desirable structural integrity, safety, and performance of the tank 100 during the filling and degassing cycles. Also, in embodiments, the first layer of reinforcement material 104 may be partially cured after being installed on the shell 102 in order to be fully consolidated and in order to fully develop its mechanical properties.

Figure 4:
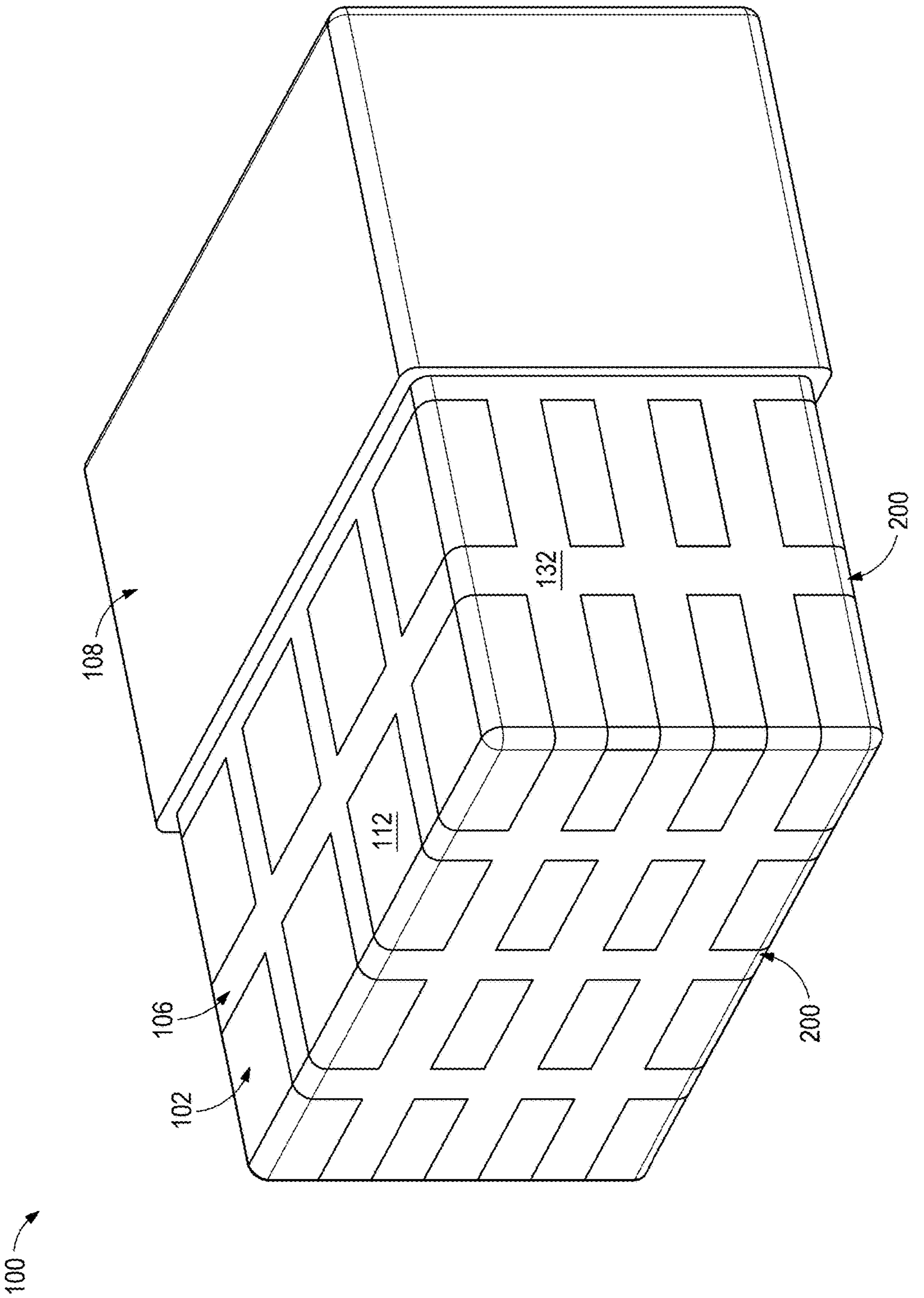
FIG. 4 is a perspective view of the shell having the first layer of reinforcement material and the intermediate material applied thereon, and part of the second layer of reinforcement material applied thereon, according to one or more embodiments of the present disclosure.

FIG. 4 depicts the shell 102 with the intermediate material 106 provided within the grooves 200. More specifically, once the first layer of reinforcement material 104 (FIGS. 1 and 3) is provided on the shell 102 within the grooves 200, as described above, the intermediate material 106 may then be positioned and otherwise received within the grooves 200 on top of the first layer of reinforcement material 104. As shown in at least FIGS. 1 and 4, the intermediate material 106 may be provided on the outside facing surface 122 (FIG. 3) of the first layer of reinforcement material 104. Once applied within the grooves 200, the intermediate material 106 provides an outside facing surface 132 that is visible/exposed.

In one or more embodiments, the first layer of reinforcement material 104 and the intermediate material 106 may be integrally formed as a single component applied to the outside facing surface 112 of the shell 102. In embodiments where the first layer of reinforcement material 104 and the intermediate material 106 are integrally formed as a single component, the single component may be applied on the recessed surfaces 206 within the grooves 200. In some embodiments, the intermediate material 106 may comprise a foam (e.g., spray injection foam, formed foam, a high density polyurethane foam, etc.). For example, the intermediate material 106 is a rigid polyurethane foam material, which may be provided in sheet or board form (e.g., LAST-A-FOAM® foam), and then cut/shaped to size in order to fit within the grooves 200 (i.e., cut/machine/shape the rigid foam material such that it conforms in shape to the grooves 200). In another example, the intermediate material 106 is a polymethacrylimide (PMI) based structural foam (e.g., ROHACELL® structural foam) which is cut/shaped to size in order to fit within the grooves 200. In other embodiments, the intermediate material 106 may comprise a honey-comb material. For example, the intermediate material 106 may be a honeycomb core material, such as Nomex® honey-comb core materials. Providing the intermediate material 106 within the grooves 200 functions to bolster and enhance the strength of the ribs 140 opposite the grooves 200, thus helping the tank 100 to store compressed substances without bowing/deflection.

FIG. 4 also depicts the tank 100 with the second layer of reinforcement material 108 partially covering the shell 102 and extending over (at least some of) the intermediate material 106 received within the grooves 200. The remaining portion of the second layer of reinforcement material 108 is omitted to enable viewing of the outer layers and structures of the tank 100, and otherwise the layers and structures configured to be covered by the second layer of reinforcement material 108. As shown, the second layer of reinforcement material 108 is provided around at least the outside facing surface 132 of the intermediate material 106. In embodiments, the second layer of reinforcement material 108 fully encapsulates (covers, encloses, encases) the tank 100, such that the second layer of reinforcement material 108 fully covers the outside facing surface 112 of the shell 102 and the outside facing surface 132 of the intermediate material 106 (as well as any portion of the first layer of reinforcement material 104 that may be exposed). For example, in embodiments, the second layer of reinforcement material 108 predominantly functions to provide counter-acting forces that are inwardly directed and oppose outwardly directed forces that may be exerted on the inside facing surface 114 of the shell 102 by compressed fluids/substances contained within the interior storage volume 116 of the shell 102. In such embodiments, the second layer of reinforcement material 108 fully encapsulates the tank 100. However, in other embodiments, the second layer of reinforcement material 108 does not fully cover (encapsulate) the tank 100 such that portions of the shell 102 and/or the intermediate material 106 (as well as portions of the first layer of reinforcement material 104) may remain exposed. For example, where the shell 102 is made from a metallic material, the second layer of reinforcement material 108 may only partially cover/encapsulate the tank 100, and a stress analysis of the tank 100 may be conducted to ascertain which portions of the tank 100 should be reinforced with the second layer of reinforcement material 108.

The second layer of reinforcement material 108 may comprise a composite material, for example, in the form of a skin, a tape, or a wrap that may be tensioned and wrapped around the shell 102 following assembly of the first layer of reinforcement material 104 and the intermediate material 106 within the grooves 220. The second layer of reinforcement material 108 may be applied under tension, which applies compressive stress to the shell 102 and thereby helps the shell 102 maintain its shape when pressurized materials are stored within the interior storage volume 116 (FIG. 1). In some embodiments, the second layer of reinforcement material 108 may comprise the same material as the first layer of reinforcement material 104. Accordingly, the second layer of reinforcement material 108 may also comprise a carbon fiber material, such as a CFRP tape. Also, in embodiments, the second layer of reinforcement material 108 may be cured after being installed in order to be fully consolidated and in order to fully develop its mechanical properties. By using the same type of material for both the first layer or reinforcement material 104 and the second layer of reinforcement material 108, a single curing temperature/step may be used when curing and, moreover, utilizing a single type of material will increase manufacturing efficiencies. The second layer of reinforcement material 108 may have a thickness that ranges between 2 and 10 mm; however, other thicknesses may be utilized depending on the end use parameters of the tank 100, such as the operating pressure experienced within the tank 100, the material properties of the tank 100, as well as the size and shape of the tank 100. In embodiments, the second layer of reinforcement material 108 is in the form of a tape or a wrap that can be tightly wound around the shell 102. In embodiments, multiple layers of the second layer of reinforcement material 108 may be applied, for example, by wrapping the material around the tank 100 several times. The second layer of reinforcement material 108 may be applied to the tank 100 at various tensions, and the tension at which it is to be applied may depend on various parameters as discussed above with reference to the first layer of reinforcement material 104. Also, the tension at which second layer of reinforcement material 108 is applied may be selected to provide further reinforcement of the tank 100. The second layer of reinforcement material 108 may be applied using a filament winding machine or using an automated fiber placement (AFP) process or machine.

Figure 5:
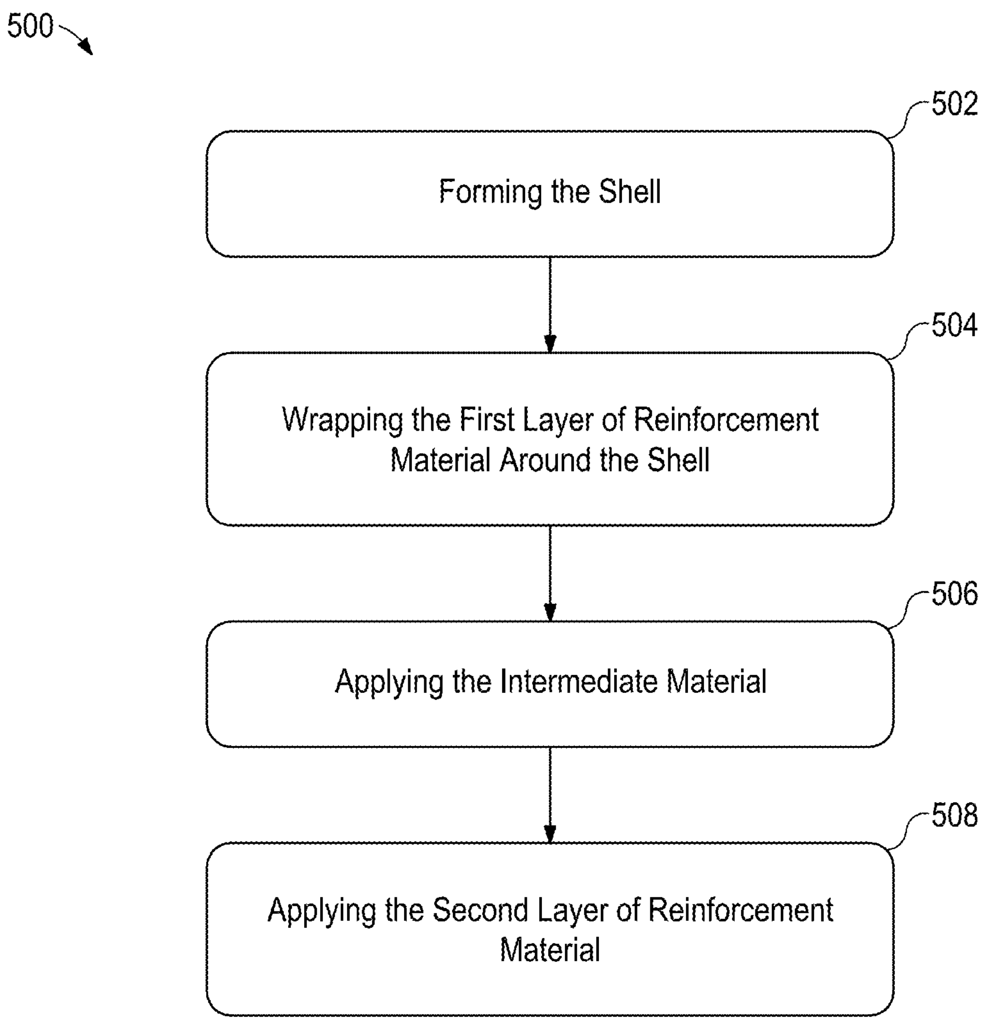
FIG. 5 is a schematic flowchart of an example method manufacturing a hydrogen storage tank, according to one or more embodiments of the present disclosure.

FIG. 5 is a schematic flowchart of an example method 500 for manufacturing the tank 100, according to one or more embodiments. The method 500 will be discussed with reference to the structural components of the tank 100 shown in FIGS. 1-4. As indicated, the method 500 may begin at 502 with forming the shell 102. As mentioned above, the shell 102 may include the outside facing surface 112, and the inside facing surface 114 opposite the outside facing surface 112, which defines the interior storage volume 116. In addition, the shell 102 may include the plurality of ribs 140 protruding from the inside facing surface 114 and into the interior storage volume 116. The shell 102 may further provide the plurality of grooves 200 that extend into and are otherwise defined by the outside facing surface 112 of the shell 102. Each groove 200 may correspond with a corresponding one of the ribs 140. The shell 102 may be formed via a variety of manufacturing techniques, such as additive manufacturing, 3D printing, metal skin welding, rotational molding, or blow molding.

The method 500 may continue at 504 with applying the first layer of reinforcement material 104 to the shell 102. In embodiments, the first layer of reinforcement material 104 is applied via an AFP process or machine. In some embodiments, as mentioned above, the first layer of reinforcement material 104 may be applied by wrapping it around the outside facing surface 112 of the shell 102 and, more specifically, within the grooves 200 formed in the shell 102. In embodiments, the first layer of reinforcement material 104 is a carbon fiber tape or tow, and wrapping the first layer of reinforcement material 104 around the shell 102 may include wrapping the carbon fiber tape within the grooves 200. When wrapping the first layer of reinforcement material 104, tension is applied to the first layer of reinforcement material 104 such that it is wrapped tightly around the shell 102 to thereby apply a compressive force to the shell 102 and thereby help counteract opposite forces that may be exerted on the inside facing surface 114 of the shell by pressurized fluids/substances contained within the interior storage volume 116.

The method 500 may continue at 506 with applying the intermediate material 106. This step may include applying the intermediate material 106 within the grooves 200 and to the outside facing surface 122 of the first layer of reinforcement material 104. For example, where the first layer of reinforcement material 104 is applied to the entirety of the recessed surfaces 206 of the grooves 200, the intermediate material 106 may be applied to just the outside facing surface 122 of the first layer of reinforcement material 104. However, where the first layer of reinforcement material 104 is just applied to the base wall surface 212 but not to the sidewall surfaces 210 of the grooves 200, the intermediate material 106 may be applied to the sidewall surfaces 210 of the groove 200 as well as the outside facing surface 122 of the first layer of reinforcement material 104. In embodiments, the intermediate material 106 is a spray or injection foam and applying the intermediate material 106 includes spraying or injecting the foam onto the first layer of reinforcement material 104. In embodiments, an injection machine may be used to squeeze/inject/insert the intermediate material 106 in the grooves 200. In other embodiments, the intermediate material 106 may be an expanding foam that is sprayed into the grooves 200, and then excess portions of the expanding foam may be trimmed. In other embodiments, the intermediate material 106 is machined to size so that it fits the grooves 200 (e.g., machined rigid foam components), and then such machined to size foam components may be inserted in the grooves 200.

The method 500 may continue at 508 with applying the second layer of reinforcement material 108 to the shell 102. In embodiments, the second layer of reinforcement material 108 may be applied using a filament winding machine or using an AFP process or machine. Applying the second layer of reinforcement material 108 may include applying (e.g., wrapping) it around at least the outside facing surface 122 of the intermediate material 106, such that the intermediate material 106 is trapped and contained between the shell 102 (and the first layer of reinforcement material 104 thereon) and the second layer of reinforcement material 108. Applying the second layer of reinforcement material 108 may include wrapping it around the outside facing surface 112 of the shell 102 and the outside facing surface 122 of the intermediate material 106. In embodiments, the second layer of reinforcement material 108 is a carbon fiber wrap or tape and applying the second layer of reinforcement material 108 includes wrapping the carbon fiber wrap or tape around the intermediate material 106 and the shell 102.

When applying the second layer of reinforcement material 108, tension is applied to the second layer of reinforcement material 108 such that it is wrapped tightly around the shell 102 to thereby apply a compressive force to the shell 102 that helps counteract opposite forces that may be exerted on the inside facing surface 114 of the shell by compressed fluids/substances contained within the interior storage volume 116. In embodiments where the second layer of reinforcement material 108 is a CFRP tape, such CFRP tape may be applied using a filament winding machine with dry fiber tows and a resin bath system, or by using pre-impregnated thermoset filament.

According to yet another method of manufacturing the tank 102, the shell 102 is first manufactured as first component, as detailed above, and then the other components are separately assembled together as a second component. For example, after manufacture of the tank 102, the first layer of reinforcement material 104 and the intermediate material 106 are manufactured, assembled together, and then partially or fully cured to form what is referred to as the structural layer. Thus, a top side of this structural layer would be the intermediate material 106; however, in some embodiments, the structural layer also includes (at least couple of layers of) the second layer of reinforcement material 108 applied on the intermediate layer 106, such that the top side of this structural layer would be the second layer of reinforcement material 108. Then, the structural layer may be machined (i.e., cut or shaped) to the size of the grooves 200 and then placed in the grooves 200. Then, the final layers of the second layer of reinforcement material 108 is wrapped around the structural layer at suitably high tension to compress it against the shell 102 and help ensure that the structural layer is fully contained and supported therein. In embodiments, an adhesive film may be inserted between the shell 102 and the first layer of reinforcement 104 of the structural layer, or between a top of the structure layer (regardless of whether the top of the structural layer is the intermediate layer 106 or the second layer of reinforcement material 108 and the second layer of reinforcement 108. This adhesive film will improve the bondability and shear strength between the layers. The adhesive film may be selected to be compatible with the cure cycles of the CFRP tape materials. For example, in some embodiments at least some of the adhesive film includes unsupported or supported carrier or veil, and such material may have weight ranges between 150-300 gram per square meter. The adhesive film may be produced with a carrier of lightweight woven glass or nylon materials (i.e., a supported film), or the adhesive film may be produced without a carrier (i.e. unsupported). As will be appreciated, the adhesive film may be used to increase the bond strength between prepreg materials (i.e., such as the first layer of reinforcement material 104 and/or the second layer of reinforcement material 108) and foam or honeycomb layer (i.e., such as the intermediate layer 106), and the adhesive film may also be used once two partially cured composite parts (i.e., such as the first layer of reinforcement material 104 and/or the second layer of reinforcement material 108) are assembled together. The adhesive film may be implemented at the contact points between layers, before the entire and fully assembled tank 100 is subjected to a final cure stage.

The method 500 may also include one or more curing steps. In some embodiments, after the first layer of reinforcement material 104, the intermediate material 106, and the second layer of reinforcement material 108 have all been assembled on the shell 102 as detailed herein to form the tank 100, the tank 100 may be subjected to a single curing step. In such single curing step, the first layer of reinforcement material 104, the intermediate material 106, and the second layer of reinforcement material 108 are all fully cured together. This will provide an efficient and cost effective way to produce the tank 100 as it utilizes a single cure cycle. In other embodiments, however, method 500 may include more than one curing step. For example, the first layer of reinforcement material 104 and the intermediate layer 106 may be installed on the shell 102, and then some or part of the second layer of reinforcement material 108 is applied (i.e., just some of the second layer of reinforcement material 108 may be wrapped around the underlying structure, such that only a few layers of the second layer of reinforcement material 108 is applied). Applying just some of the second layer of reinforcement material 108 may be beneficial in cases where fully applying all of the second layer of reinforcement material 108 under tension may collapse the shell 102 or deform the intermediate material 106. Then, the first layer of reinforcement material 104, the intermediate layer 106, and the portion of the second layer of reinforcement material 108 that was applied are partially cured via a first curing step, so as to enhance rigidity of the underlying structure before applying the remainder of the second layer of reinforcement material 108, such that further application of the second layer of reinforcement material 108 will not collapse the shell 102 and/or deform the intermediate material 106. Thereafter, the remainder of the second layer of reinforcement material 108 may be applied to fully form the tank 100, and then the fully formed tank 100 may be subjected to a second curing step to ensure that the tank 100 is fully cured. As mentioned, this may be useful in cases where the shell 102 could collapse or the intermediate material 106 may deform under high tension introduced by application of the entirety of the second layer of reinforcement material 108 in a single step. Thus, in this case the partially cured layers (i.e., the first layer of reinforcement material 104, the intermediate material 106, and part of the second layer of reinforcement material 108) become a rigid structure on which to wind the remaining amount of the second layer of reinforcement material 108 under very high tension.

Embodiments disclosed herein include:

A. A storage tank, comprising: a shell having an outside facing surface, an inside facing surface opposite the outside facing surface and defining an interior storage volume, a plurality of grooves defined on the outside facing surface, and a plurality of ribs extending into the interior storage volume from the inside facing surface; a first layer of reinforcement material applied within the plurality of grooves; an intermediate material arranged within the plurality of grooves such that the first layer of reinforcement material interposes the shell and the intermediate material; and a second layer of reinforcement material provided about and encapsulating the shell.

B. A method of manufacturing a storage tank, comprising: forming a shell having an outside facing surface, an inside facing surface opposite the outside facing surface and defining an interior storage volume, a plurality of grooves defined on the outside facing surface, and a plurality of ribs extending into the interior storage volume from the inside facing surface; wrapping a first layer of reinforcement material around the outside facing surface of the shell and within the plurality of grooves; applying an intermediate material within the plurality of grooves such that the first layer of reinforcement material interposes the shell and the intermediate material; and applying a second layer of reinforcement material about the shell and thereby encapsulating the shell.

C. A storage tank, comprising: a shell having an exterior surface, an interior surface opposite the exterior surface and defining an interior storage volume, a plurality of grooves defined in the exterior surface and thereby forming a plurality of ribs protruding into the interior storage volume; a first layer of a composite material wrapped about the shell and arranged within the plurality of grooves; foam provided within the plurality of grooves such that the first layer of composite material interposes the shell and the foam; and a second layer of a composite material wrapped about and encapsulating the shell.

Each of embodiments A through C may have one or more of the following additional elements in any combination: Element 1: wherein each groove of the plurality of grooves corresponds with a corresponding one of the plurality of ribs. Element 2: wherein each groove and each rib extend continuously around the shell. Element 3: wherein the first and second layers of reinforcement material comprise composite materials. Element 4: wherein the first layer of reinforcement material and the second layer of reinforcement material each comprises a carbon fiber tape or a carbon fiber tow. Element 5: wherein the intermediate material comprises a foam material selected from the group consisting of high density polyurethane foam or a polymethacrylimide (PMI) based structural foam. Element 6: wherein the intermediate material comprises a honey-comb core material. Element 7: wherein the plurality of grooves includes a first set of grooves and a second set of grooves that intersect the first set of grooves. Element 8: wherein the first set of grooves extend perpendicular to the second set of grooves. Element 9: wherein the shell exhibits a rectangular, elliptical, or cuboidal cross-section. Element 10: wherein the outside facing surface of the shell further comprises: an exterior surface outside of the grooves; and recessed surfaces within the grooves, the recessed surfaces being offset and/or angled inward toward the interior storage volume, wherein the first layer of reinforcement material is applied on the recessed surfaces within the grooves. Element 11: wherein the recessed surfaces further comprise: a pair of sidewall surfaces extending from the exterior surface and inward toward the interior storage volume; and a base wall surface extending between the pair of sidewall surfaces, wherein the first layer of reinforcement material is applied on the base wall surface within at least one of the grooves. Element 12: wherein the first layer of reinforcement material is further applied on at least some of the pair of sidewall surfaces within the grooves. Element 13: wherein the first layer of reinforcement material and the intermediate material are integrally formed as a single component.

Element 14: wherein forming the shell further comprises manufacturing the shell via additive manufacturing, rotational molding, or blow molding. Element 15: wherein the intermediate material comprises a foam material, and the applying the intermediate material further comprises injecting the foam material within the grooves. Element 16: wherein the intermediate material comprises a rigid foam material, and the applying the intermediate material further comprises machining the rigid foam material to conform in shape to the grooves. Element 17: wherein the second layer of reinforcement material comprises a carbon fiber wrap, and applying the second layer of reinforcement material comprises wrapping the carbon fiber wrap around the shell and the intermediate material.

The terminology used herein is for the purpose of describing particular embodiments only and is not intended to be limiting of the invention. As used herein, for example, the singular forms “a,” “an,” and “the” are intended to include the plural forms as well, unless the context clearly indicates otherwise. It will be further understood that the terms “contains”, “containing”, “includes”, “including,” “comprises”, and/or “comprising,” and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of “third” does not imply there must be a corresponding “first” or “second.” Also, if used herein, the terms “coupled” or “coupled to” or “connected” or “connected to” or “attached” or “attached to” may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A storage tank, comprising:

a shell having an outside facing surface, an inside facing surface opposite the outside facing surface and defining an interior storage volume, a plurality of grooves defined on the outside facing surface, and a plurality of ribs extending into the interior storage volume from the inside facing surface;

a first layer of reinforcement material applied within the plurality of grooves;

an intermediate material arranged within the plurality of grooves such that the first layer of reinforcement material interposes the shell and the intermediate material; and a second layer of reinforcement material provided about and encapsulating the shell.

2. The storage tank of claim 1, wherein each groove of the plurality of grooves corresponds with a corresponding one of the plurality of ribs.

3. The storage tank of claim 2, wherein each groove and each rib extend continuously around the shell.

4. The storage tank of claim 1, wherein the first and second layers of reinforcement material comprise composite materials.

5. The storage tank of claim 4, wherein the first layer of reinforcement material and the second layer of reinforcement material each comprises a carbon fiber tape or a carbon fiber tow.

6. The storage tank of claim 1, wherein the intermediate material comprises a foam material selected from the group consisting of high density polyurethane foam or a polymethacrylimide (PMI) based structural foam.

7. The storage tank of claim 1, wherein the intermediate material comprises a honey-comb core material.

8. The storage tank of claim 1, wherein the plurality of grooves includes a first set of grooves and a second set of grooves that intersect the first set of grooves.

9. The storage tank of claim 8, wherein the first set of grooves extend perpendicular to the second set of grooves.

10. The storage tank of claim 1, wherein the shell exhibits a rectangular, elliptical, or cuboidal cross-section.

11. The storage tank of claim 1, wherein the outside facing surface of the shell further comprises:

an exterior surface outside of the grooves; and recessed surfaces within the grooves, the recessed surfaces being offset and/or angled inward toward the interior storage volume, wherein the first layer of reinforcement material is applied on the recessed surfaces within the grooves.

12. The storage tank of claim 11, wherein the recessed surfaces further comprise:

a pair of sidewall surfaces extending from the exterior surface and inward toward the interior storage volume; and a base wall surface extending between the pair of sidewall surfaces, wherein the first layer of reinforcement material is applied on the base wall surface within at least one of the grooves.

13. The storage tank of claim 12, wherein the first layer of reinforcement material is further applied on at least some of the pair of sidewall surfaces within the grooves.

14. The storage tank of claim 1, wherein the first layer of reinforcement material and the intermediate material are integrally formed as a single component.

15. A method of manufacturing a storage tank, comprising:

forming a shell having an outside facing surface, an inside facing surface opposite the outside facing surface and defining an interior storage volume, a plurality of grooves defined on the outside facing surface, and a plurality of ribs extending into the interior storage volume from the inside facing surface;

wrapping a first layer of reinforcement material around the outside facing surface of the shell and within the plurality of grooves;

applying an intermediate material within the plurality of grooves such that the first layer of reinforcement material interposes the shell and the intermediate material; and applying a second layer of reinforcement material about the shell and thereby encapsulating the shell.

16. The method of claim 15, wherein forming the shell further comprises manufacturing the shell via additive manufacturing, rotational molding, or blow molding.

17. The method of claim 15, wherein the intermediate material comprises a foam material, and the applying the intermediate material further comprises injecting the foam material within the grooves.

18. The method of claim 15, wherein the intermediate material comprises a rigid foam material, and the applying the intermediate material further comprises machining the rigid foam material to conform in shape to the grooves.

19. The method of claim 15, wherein the second layer of reinforcement material comprises a carbon fiber wrap, and applying the second layer of reinforcement material comprises wrapping the carbon fiber wrap around the shell and the intermediate material.

20. A storage tank, comprising:

a shell having an exterior surface, an interior surface opposite the exterior surface and defining an interior storage volume, a plurality of grooves defined in the exterior surface and thereby forming a plurality of ribs protruding into the interior storage volume;

a first layer of a composite material wrapped about the shell and arranged within the plurality of grooves;

foam provided within the plurality of grooves such that the first layer of composite material interposes the shell and the foam; and a second layer of a composite material wrapped about and encapsulating the shell.

* * * * *